(12) United States Patent
Rosenberg

(10) Patent No.: US 7,481,019 B2
(45) Date of Patent: Jan. 27, 2009

(54) APPARATUS AND METHOD FOR SECURING BAIT FISH

(76) Inventor: Howard Rosenberg, 3661 State Rd. 84, Ft. Lauderdale, FL (US) 33312

( * ) Notice: Subject to any disclaimer, the term of this patent is extended or adjusted under 35 U.S.C. 154(b) by 100 days.

(21) Appl. No.: 11/256,522

(22) Filed: Oct. 20, 2005

(65) Prior Publication Data

US 2007/0089353 A1    Apr. 26, 2007

(51) Int. Cl.
*A01K 83/06* (2006.01)
(52) U.S. Cl. .................. 43/44.8; 43/44.4; 43/44.6; 7/106
(58) Field of Classification Search .......... 43/44.2, 43/44.4, 44.6, 44.8; 7/106; 81/418, 426.5, 81/424.5
See application file for complete search history.

(56) References Cited

U.S. PATENT DOCUMENTS

| 103,645 | A | * | 5/1870 | Muscroft | 43/43.16 |
|---|---|---|---|---|---|
| 321,133 | A | * | 6/1885 | Osborne | 81/424.5 |
| 608,348 | A | * | 8/1898 | Stadel | 43/44.6 |
| 841,951 | A | * | 1/1907 | Evans | 43/44.4 |
| 863,272 | A | * | 8/1907 | Gebhardt | 43/44.8 |
| 908,947 | A | * | 1/1909 | Burkhart | 81/426.5 |
| 1,114,698 | A | * | 10/1914 | Lane | 43/44.4 |
| 1,325,530 | A | * | 12/1919 | Ore | 43/44.2 |
| 1,425,447 | A | * | 8/1922 | Brundage | 81/426.5 |
| 1,661,365 | A | * | 3/1928 | Gendron | 81/426.5 |
| 1,740,591 | A | * | 12/1929 | Harter | 81/426.5 |
| 1,745,169 | A | * | 1/1930 | Johnson | 43/44.6 |
| 1,753,080 | A | * | 4/1930 | Zwilling et al. | 81/426.5 |
| 2,115,493 | A | * | 4/1938 | Kosten | 43/44.8 |
| 2,150,874 | A | * | 3/1939 | Wagner | 43/44.4 |
| 2,222,277 | A | * | 11/1940 | Baker | 43/44.85 |
| 2,319,246 | A | * | 5/1943 | Martin | 43/44.6 |
| 2,402,730 | A | * | 6/1946 | Bucks | 43/44.4 |
| 2,533,390 | A | * | 12/1950 | Miller | 43/44.6 |
| 2,564,216 | A | * | 8/1951 | Stark | 43/44.8 |
| 2,588,526 | A | * | 3/1952 | Hoage | 43/44.6 |
| 2,616,206 | A | * | 11/1952 | Ammon | 43/44.83 |
| 2,767,505 | A | * | 10/1956 | Noyd | 43/44.6 |
| 2,842,997 | A | * | 7/1958 | Wentling | 81/418 |
| 2,847,220 | A | * | 8/1958 | Heffron et al. | 43/44.83 |
| 2,932,116 | A | * | 4/1960 | Woodzick | 43/44.6 |
| 3,161,086 | A | * | 12/1964 | Kircher | 81/426.5 |
| 3,181,340 | A | * | 5/1965 | Gruetzmacher | 81/426.5 |

(Continued)

FOREIGN PATENT DOCUMENTS

CA    2154334 A1 *    1/1997

(Continued)

*Primary Examiner*—Darren W Ark
(74) *Attorney, Agent, or Firm*—McHale & Slavin, P.A.

(57) ABSTRACT

An apparatus and method for securing bait fish to a fishing hook. The apparatus is in the form of a kit and includes a bait hook attachment device and crimping pliers that provides a quick and convenient attachment point for securing to a fishing hook. The bait hook attachment device is formed from a preformed single piece of wire having two ends spaced apart and available for placement on each side of a bait. The attachment device is secured to the fish hook by crimping of wire by use of a matching crimping pliers. Upon securement of the hook assembly, an aperture is formed for use in attachment to a bait fish.

4 Claims, 4 Drawing Sheets

U.S. PATENT DOCUMENTS

| | | | | |
|---|---|---|---|---|
| 3,200,532 | A * | 8/1965 | Walton | 43/44.6 |
| 3,415,004 | A * | 12/1968 | Whalen | 43/44.6 |
| 3,541,719 | A * | 11/1970 | Temple | 43/44.6 |
| 3,748,773 | A * | 7/1973 | Goforth | 43/44.6 |
| 3,750,323 | A * | 8/1973 | Weis | 43/42.28 |
| 3,808,915 | A * | 5/1974 | Bonnel, Sr. | 81/426.5 |
| 3,825,961 | A * | 7/1974 | Klein | 7/106 |
| 3,847,037 | A * | 11/1974 | Fox | 81/424.5 |
| 4,008,912 | A * | 2/1977 | Kotov | 289/1.2 |
| 4,219,919 | A * | 9/1980 | Fischbein et al. | 81/424.5 |
| 4,221,069 | A * | 9/1980 | Esses | 43/44.2 |
| 4,307,532 | A * | 12/1981 | Hughs | 43/44.4 |
| 4,372,182 | A * | 2/1983 | Kolter | 81/426 |
| 4,554,756 | A * | 11/1985 | Thomas | 43/44.6 |
| 4,625,451 | A * | 12/1986 | Griffiths | 43/44.4 |
| 4,646,464 | A * | 3/1987 | Wyatt | 43/44.4 |
| 4,785,571 | A * | 11/1988 | Beck | 43/44.4 |
| 4,796,318 | A * | 1/1989 | Bigej | 7/106 |
| 4,905,403 | A * | 3/1990 | Manno | 43/43.16 |
| 4,910,907 | A * | 3/1990 | Schlaegel | 43/44.6 |
| 4,919,021 | A * | 4/1990 | Franks | 81/426.5 |
| 4,920,593 | A * | 5/1990 | Finn | 81/426.5 |
| 4,947,575 | A * | 8/1990 | Yerkovich | 43/44.4 |
| 5,063,705 | A * | 11/1991 | Pool | 43/44.6 |
| 5,117,575 | A * | 6/1992 | Desmond | 43/44.8 |
| 5,209,143 | A * | 5/1993 | Sweet | 81/424.5 |
| 5,313,736 | A * | 5/1994 | Rosenberg et al. | 43/44.83 |
| 5,386,661 | A * | 2/1995 | Davis | 43/44.8 |
| 5,548,920 | A * | 8/1996 | Peddycoart | 43/44.2 |
| 5,572,914 | A * | 11/1996 | Coleman | 81/424.5 |
| 5,855,048 | A * | 1/1999 | Synowicki et al. | 81/424.5 |
| 6,035,748 | A * | 3/2000 | Burch, Jr. | 81/424.5 |
| 6,050,023 | A * | 4/2000 | Newell | 43/44.6 |
| 6,665,978 | B1 * | 12/2003 | Reed | 43/44.4 |
| 6,748,831 | B2 * | 6/2004 | Eto | 81/424.5 |
| 6,895,710 | B2 * | 5/2005 | Hanson | 43/44.6 |
| 6,923,097 | B2 * | 8/2005 | Takasaki | 81/424.5 |
| 7,114,414 | B1 * | 10/2006 | Peck | 81/426.5 |
| 2002/0184977 | A1 * | 12/2002 | Eidson | 81/426.5 |
| 2003/0233915 | A1 * | 12/2003 | Takasaki | 81/424.5 |
| 2005/0044772 | A1 * | 3/2005 | Lillard | 43/44.6 |

FOREIGN PATENT DOCUMENTS

| | | | |
|---|---|---|---|
| EP | 689764 A1 | * | 1/1996 |
| FR | 2509133 A | * | 1/1983 |
| FR | 2809283 A1 | * | 11/2001 |
| GB | 2416470 A | * | 2/2006 |
| JP | 10-178971 A | * | 7/1998 |
| RU | 2005368 C1 | * | 1/1994 |
| WO | WO-2005/048701 A1 | * | 6/2005 |

* cited by examiner

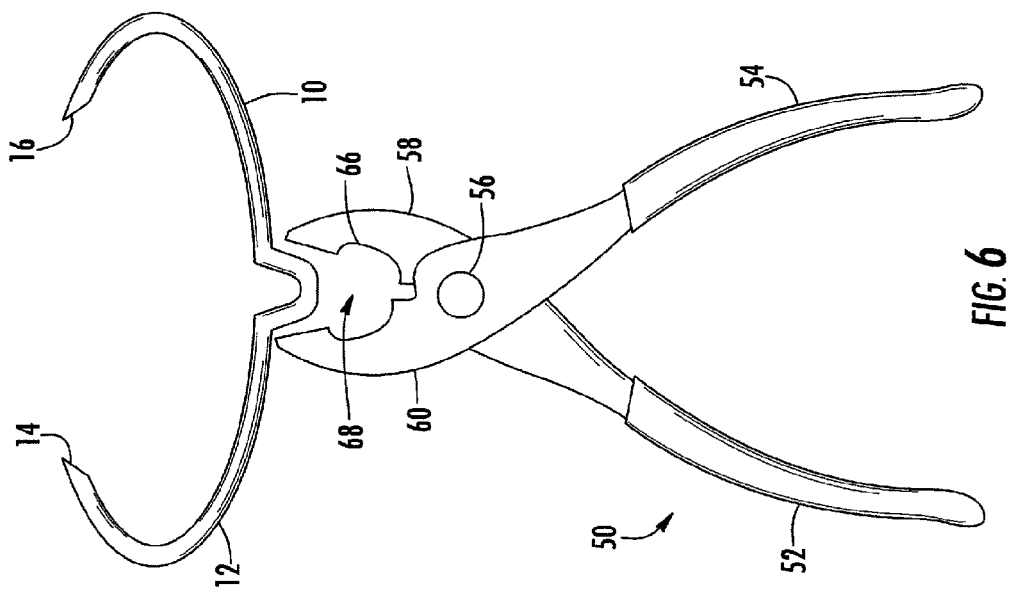
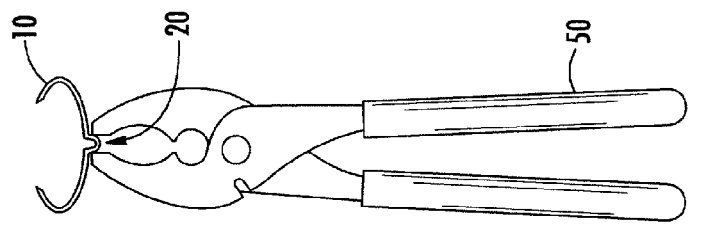
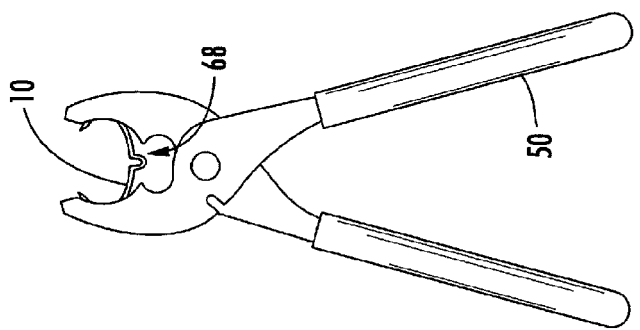
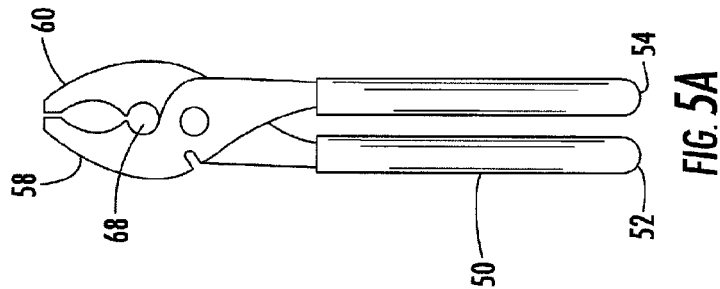

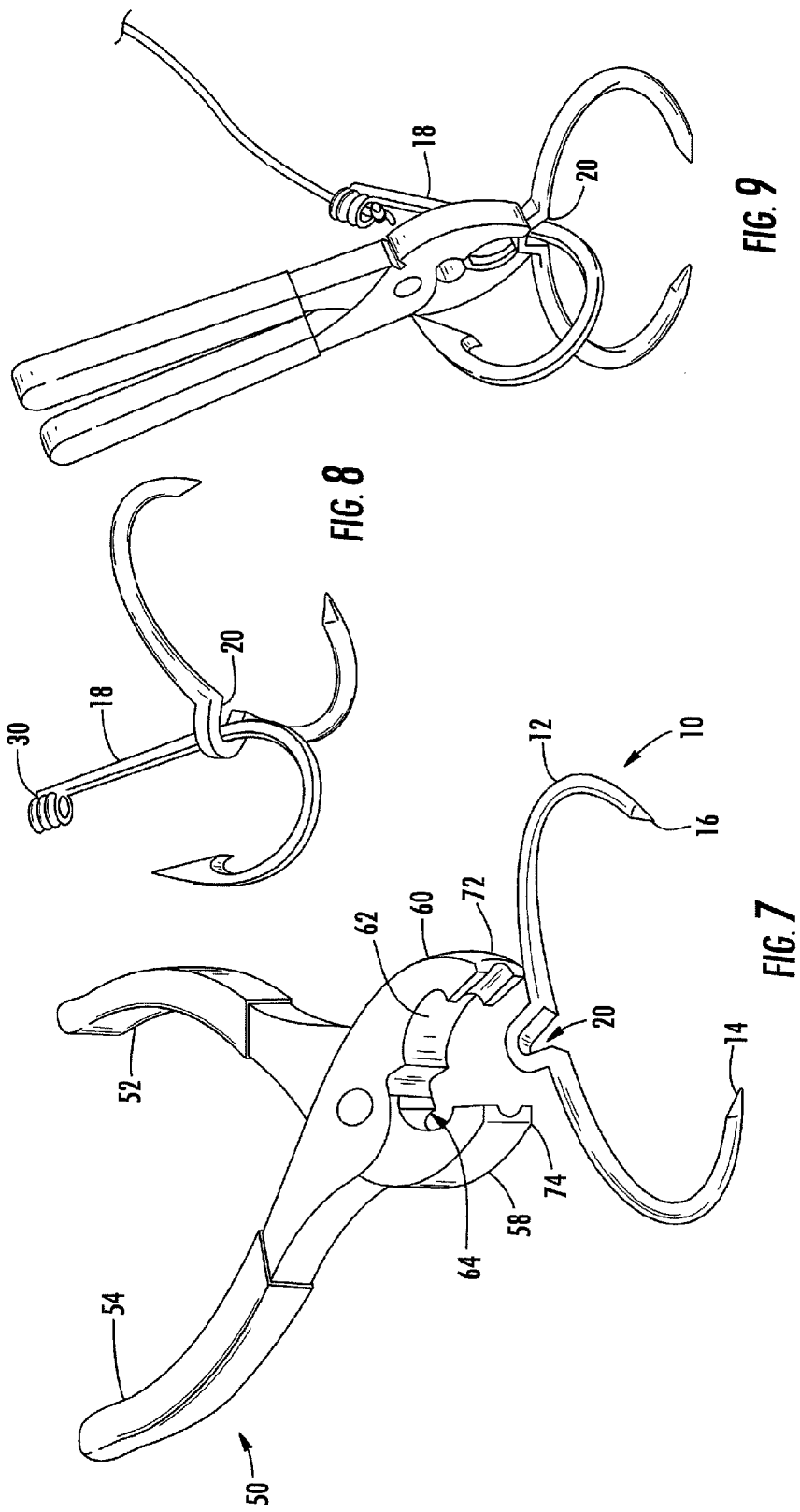

APPARATUS AND METHOD FOR SECURING BAIT FISH

FIELD OF THE INVENTION

This invention is directed to the field of fishing and in particular to an apparatus and method for securing live bait fish by use of a bait attachment device and associated crimper.

BACKGROUND OF THE INVENTION

The rigging of live bait fish is necessary to attract certain types of fish or otherwise enhance the chances to catch game fish. Professional anglers understand the need for quick and secure rigging, the lack of either can result in a lost opportunity. Recreational anglers have even a greater difficulty in understanding the technique of live bait fish rigging as it takes years of experience to understand the type of rigging necessary to safely secure a fish and not impede the swimming action of the fish. Live bait is an expensive investment for most anglers and great care must be taken during rigging to prevent loss of the bait fish. By way of example, bait fishes used in offshore fishing include goggle-eye, small mackerel, pinfish and grunts to name a few. Bait fish are used to target marlin, sailfish, dolphin, tuna, wahoo, any so forth, many of which are targets in a fishing tournament. In 2005, six goggle-eye bait fish cost over $80.00 at the Lake Worth Inlet in Florida.

An improperly rigged bait fish can free itself quickly. Rigging of a replacement bait fish is time consuming and if the loss occurs at a critical moment, such as the spotting of a game, the result can be the loss of a tournament. Attempting to install a conventional rigging in high seas is very difficult since the bait hook is designed to pierce skin upon contact. Further, improper rigging may cause the bait fish to swim abnormally or prematurely expire. If properly rigged, a bait fish can swim indefinitely and remain strong enough to survive various fishing techniques such as kite fishing and slow trolling.

The problem with bait fish rigging, to which this invention addresses, arises in the difficulty of securing bait fish in a manner that does not stress the bait fish or be overly complicated for the fisherman. Current rigging techniques are complicated and difficult to perform while on the water, especially in high seas. Alternatively, the most simplified rigging technique, namely placing a fish hook beneath the dorsal fin works well with kite fishing but does not allow for proper positioning of the bait hook. For certain types of fish, this placement does not position the fishing hook in a proper position for a positive hookup, which can result in lost opportunities. Placement of the fish hook in a bait fish is important if you want them to stay alive and swim naturally.

What is lacking in the art is a quick and convenient way of attaching live bait fish to a fishing hook eliminating the need for complex rigging and providing similar, if not enhanced, performance characteristics of a rigged bait.

SUMMARY OF THE INVENTION

The present invention is an attachment apparatus and method for securing bait fish to a fishing hook. The kit includes a preformed single piece U-shaped wire which is defined as the bait hook attachment device. Each end of the attachment device is available for insertion into a bait fish by side entry. A crimping pliers arranged to be operable by one hand includes pivot jaws having a cooperative groove for engaging an outer surface of the bait hook attachment device for closing the bait hook about the shank of the fishing hook. Once the bait hook attachment device is secured to the fishing hook, it can be attached to a live bait fish.

Thus, an objective of the invention is to provide a kit that facilitates quick and secure attachment of live bait fish to a fishing hook.

Yet another objective of the invention is to provide a bait hook attachment device that allows for securement to most any size fishing hook.

Another objective of the invention is to allow a fisherman the ease of rigging a bait fish despite sea conditions.

Yet another objective of the invention is to allow bait fish the ability to stay in a live well, without any stress of rigging or hooks or attachments, extending the life of the bait fish and insuring maximum freshness and most important the ability to attract the game fish by reason of its liveliness.

Still another objective of the invention is to provide a bait attachment that can be secured by one hand and upon attachment allows the bait to continue swimming without impediment.

Still another objective of the invention is to provide a method for securing bait to a fishing hook comprising the steps of: providing a bait hook attachment device formed from a preformed single piece of wire having a first end spaced apart from a second end by a U-shaped center section forming a clover ring with an inner surface and an outer surface; attaching the bait hook attachment device to a fishing hook, positioning a bait between said spaced apart first and second end of said preformed bait hook attachment device; closing said bait hook attachment device around said bait fish by use of a pliers operable to engage the outer surface of said bait hook attachment device thereby positioning the first end to the second end and forming the center section aperture.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 5A is a plane view of the crimping tool in a closed position;

FIG. 5B is a plane view of the crimping tool is a open position;

FIG. 5C is a plane view of the crimping tool closing on the bait hook attachment device;

FIG. 6 is a plane view of the crimping tool in position for engaging a bait hook attachment device;

FIG. 7 is a plane view of the crimping tool in position for engaging a bait hook attachment device;

FIG. 8 is a plane view of the bait hook attachment device positioned ov er a fishing hook;

FIG. 9 is a plane view of bait hook attachment device being crimped over a fishing hook and FIG. 10 is a perspective view of bait hook attachment device being crimped over bait fish.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
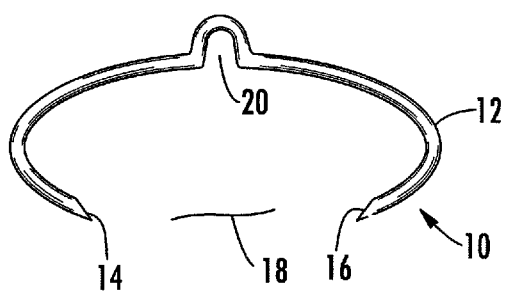
FIG. 1 is a plane view of the bait hook attachment device in an open position.
Figure 2:
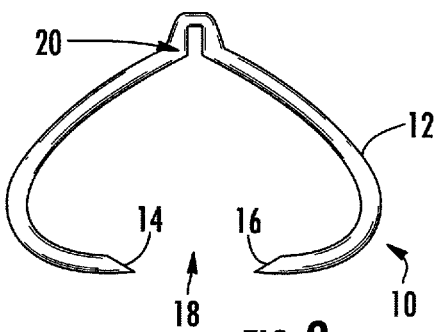
FIG. 2 is a plane view of bait hook shown in FIG. 1 in a partially closed position.
Figure 3:
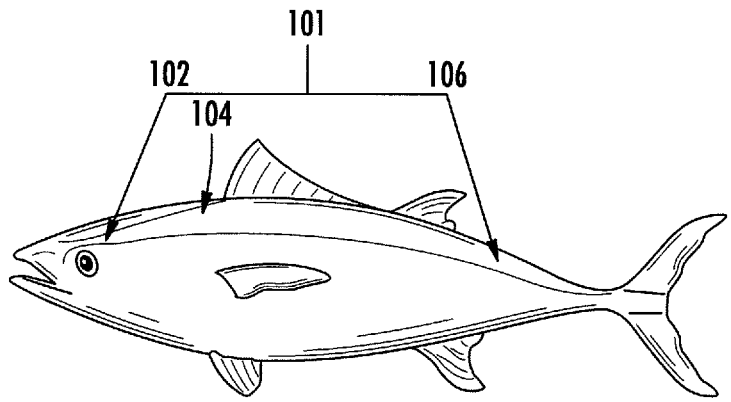
FIG. 3 is an illustrative view of a bait fish.

Now referring to FIGS. 1 and 2, depicted is the bait hook attachment device 10 formed from a rigid wire 12 having a first end 14 spaced apart from a second end 16 by a U-shaped center portion forming an opening 18 therebetween. The wire 12 includes a hook shank engagement area forming a chamber opening 20 in the U-shaped wire sized to receive the shank of a fish hook. The chamber opening has a first side, a second side, and a back side, the back side is centrally located between the first end and the second end and extends generally transverse to the first side and the second side. The back side of the chamber opening is located opposite the opening and is centrally located between the first and the second end. The chamber opening is in communication with the opening so that the fish hook must be positioned on the same interior perimeter as the bait. Ends 14 & 16 are sharpened for ease of insertion through fish tissue, the wire 12 preferably formed from a material that retains position upon the application of pressure. As illustrated in FIG. 2, upon partial closing of the opening 18, first end 14 is juxtapositioned to second end 16, chamber opening 20 is also reduced in size wherein the attachment device 10 may be placed over the bait fish before crimping to a fish hook, or preferably, crimping to a bait hook is performed after securement of the attachment device to the bait fish.

The first end 14 and the second end 16 are placed through a bait fish 100 along attachment points 102. Attachment is caused by insertion of first end 14 and second end 16 through the body of the bait 100 either behind the eyes and before the dorsal fin 102, directly before the dorsal fin 104 or behind the dorsal fin 106. The attachment device 10 operates as a harness with the bait fish. Strategic placement of the ends 14, 16 does not severely injure the bait fish or inhibit swimming.

The crimping tool or pliers 50 of the instant invention is shown in FIGS. 4, 5A-C, 6 and 7. The tool or pliers 50 employ a first handle 52 pivotally coupled to a second handle 54 along pivot point 56. A first pivot jaw 58 is formed by the first handle 52 and similarly a second pivot jaw 60 is formed by the second handle 54. The first handle 52 is arranged to be movable with respect to the second handle 54 allowing single hand operation. The pivot jaws 58 and 60 include first cooperative grooves 62 and 64 for engaging the outer surface of the bait attachment device 10. Angle curvature 66 creates an enlarged cavity 68 upon opening of the tool or pliers to permit placement of the attachment device 10 therein, wherein squeezing of the handles 52 and 54 provides a crimping procedure for crimping the attachment device.

The pivot jaws 58 and 60 further include a second cooperative groove 72 and 74 sized to engage a portion of the bait hook attachment device 10 along an outer surface of a fish hook chamber 20. The chamber 20 sized to engage a fish hook shank and by crimping the chamber 20, the chamber will be crimped to meet the size of most any sized fish hook.

Figure 4:
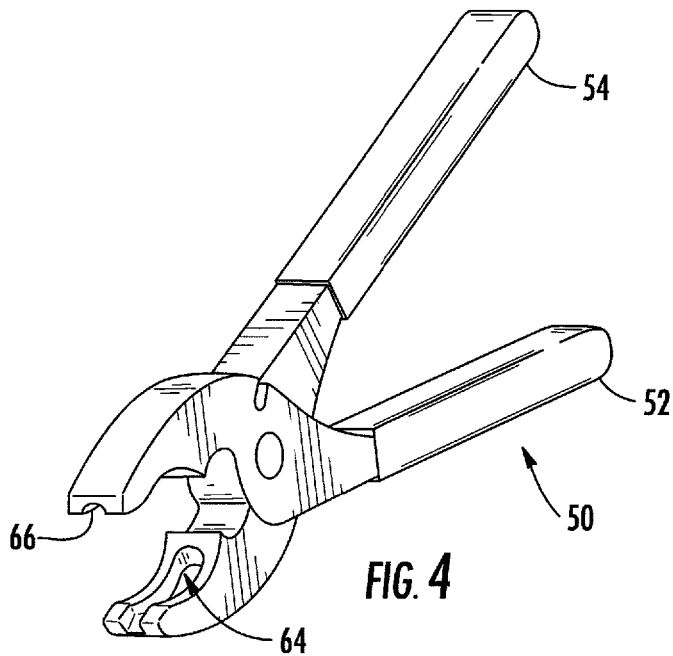
FIG. 4 is a perspective view of a crimping tool for the bait hook attachment device.
Figure 10:
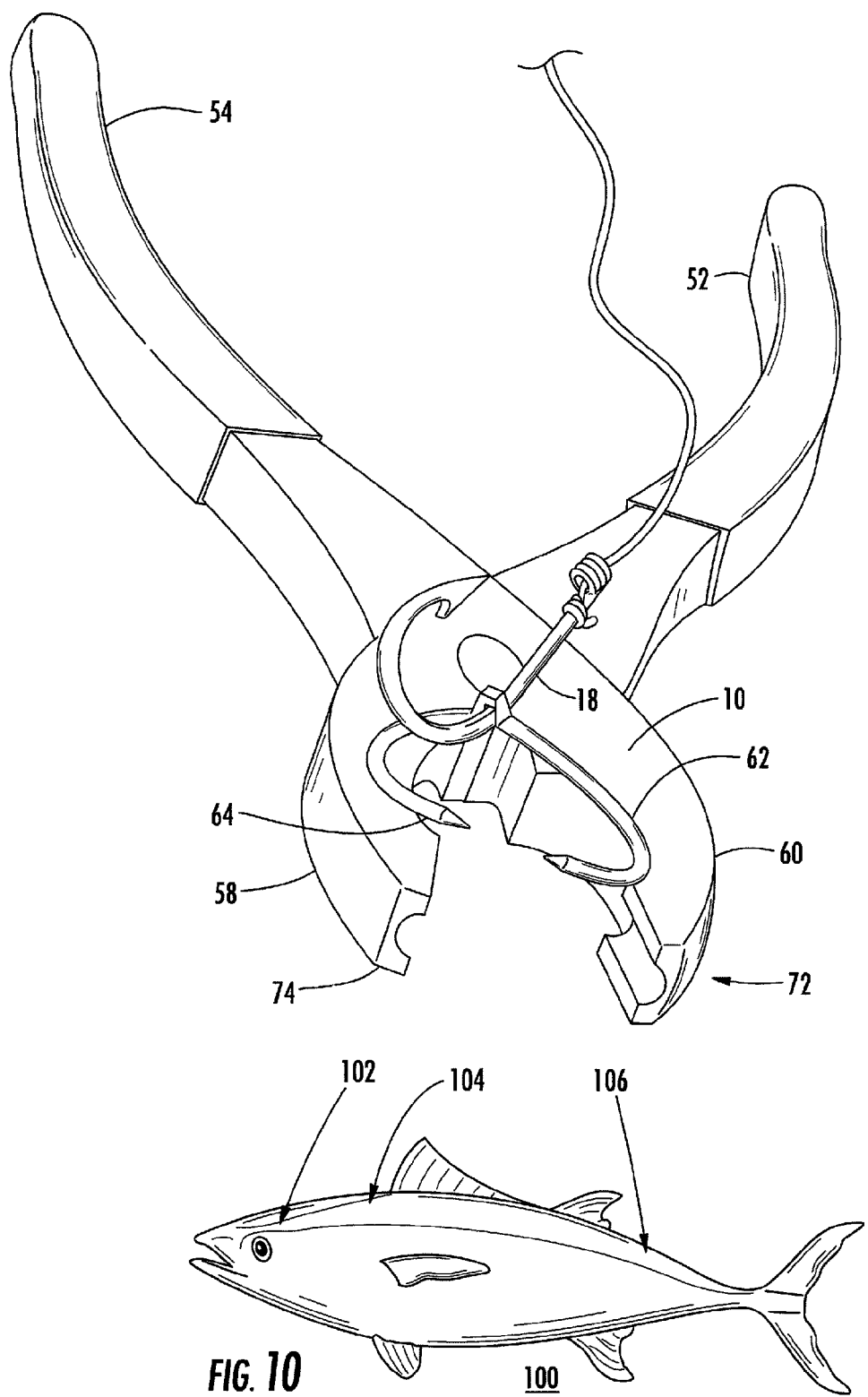

Each of the first and second pivot jaws 58 and 60 has a proximal end connected to a respective handle 52 and 54. Each of the first and second pivot jaws also has a distal end, opposite the proximal end thereof. The first cooperative grooves 62 and 64 of the pivot jaws extends from adjacent the proximal end of the pivot jaw to the second cooperative grooves 72 and 74, as illustrated in FIGS. 4, 7 and 10. The second cooperative grooves 72 and 74 extend from the first cooperative grooves to the distal end of the pivot jaws, as illustrated in FIGS. 4, 7 and 10.

Illustrated in FIG. 5A is the tool or pliers 50 in a closed position, FIG. SB depicts the tool or pliers 50 in an open position with attachment device 10 placed with in the cooperative grooves 62 and 64. FIG. 5C depicts the tool or pliers 50 in a closed position fro grasping of the bait hook attachment device 10 along fish hook shank chamber 20.

Referring to FIGS. 7-9, the pliers 50 is shown ready to engage the fish hook chamber 20 demonstrating that the bait hook attachment device can be first secured to a fish hook shank 18 and then attached to a bait fish. FIG. 8 illustrates the fish hook 18 engaging the bait attachment device 10 by placement in chamber 20. The fish hook 18 may be a conventional fish hook having a shank having an eye 30 for securement to a fishing line (not shown). A fishing line is coupled to the end 30 of the hook by either a conventional knot or by an attachment eye which is conventional with fishing hooks.

FIG. 9 illustrates the crimping of the amperture 20 around the fish hook 19. The bait hook attachment device 10 has been locked in position to the bait fish and the fishing hook 18 is placed in position for engagement of a fish. The tip 72 and 74 of the crimping device positioning the fishing hook 18 in a fixed position in relation to the bait fish.

FIG. 10 depicts the preferred embodiment of first securing a fish hook 18 to the bait hook attachment device 10. Placing the bait hook attachment device with the pliers 50 is shown ready to engage a bait fish 100 along preferred attachment points 102, 104, or 106. Compression of first handle 52 pivotally coupled to a second handle 54 along a pivot point is arranged to be movable with respect to the second handle 54 allowing single hand operation. The pivot jaws 58 and 60 include a cooperative groove 62 and 64 for engaging the outer surface of the bait attachment device 10. Angle curvature 66 creates an enlarged cavity 68 upon opening of the pliers to permit placement attachment device 10 wherein squeezing of the handles 52 and 54 provides a one handed crimping procedure for crimping the attachment device.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

The invention claimed is:

1. A kit for securing bait fish to a fishing line, said kit comprising:

a bait hook attachment device formed from a length of preformed U-shaped wire extending in a single plane forming an interior perimeter having a first end spaced apart from a second end defining an opening therebetween;

a hook shank engagement area forming a chamber opening in said U-shaped wire having a first side, a second side, and a back side, said back side centrally located between said first end and second end and extending generally transverse to said first side and said second side, said back side of said chamber opening located opposite said opening and said chamber opening being in communication with said opening, said chamber opening being located between said back side and said opening defined between said first end and said second end;

a fish hook defined as a hook shank with a sharpened point proximal end and a means for securing said shank to a fishing line;

a crimping tool having a first handle pivotally coupled to and movable with respect to a second handle and operable by one hand, a first pivot jaw being connected to said first handle and a second pivot jaw being connected to said second handle, said first pivot jaw and said second pivot jaw each having a proximal end and a distal end, said proximal end of said first pivot jaw and said proximal end of said second pivot jaw being connected to said first handle and said second handle respectively, each said first and said second pivot jaws including a first cooperative groove for engaging an extended outer surface of said bait hook attachment device and a second cooperative groove for engaging a portion of said outer surface of said hook attachment device, said first cooperative groove extending substantially parallel to and along each said first and said second pivot jaws from adjacent said proximate end of each said first and said second pivot jaws to a second cooperative groove, said second cooperative groove extending from said first cooperative groove to said distal end of each said first and said second pivot jaws;

wherein said bait hook attachment device is first slidably secured to said fish hook by securement of said chamber opening substantially around said hook shank and a bait fish is placed in said opening of said bait hook attachment device, said first cooperative grooves of said crimping tool engaging an outer surface of said bait hook attachment device causing the juxtapositioning of said first end to said second end.

2. A method for securing bait fish to a fishing hook comprising the steps of:

providing a bait hook attachment device formed from a length of preformed generally U-shaped wire extending in a single plane forming an interior perimeter having a first end spaced apart from a second end defining an opening therebetween; a hook shank engagement area forming a chamber opening in said U-shaped wire having a first side, a second side, and a back side, said back side centrally located between said first end and second end and extending generally transverse to said first side and said second side, said back side of said chamber opening located opposite said opening and said chamber opening in communication with said opening, said chamber opening being located between said back side and said opening defined between said first end and said second end;

securing said bait hook attachment device to a fish hook, said fish hook defined as a hook shank with a sharpened point proximal end and a securement means for tying said shank to a fishing line;

a crimping tool having a first handle pivotally coupled to and movable with respect to a second handle and operable by one hand, a first pivot jaw being connected to said first handle and a second pivot jaw being connected to said second handle, said first pivot jaw and said second pivot jaw each having a proximal end and a distal end, said proximal end of said first pivot jaw and said proximal end of said second pivot jaw being connected to said first handle and said second handle respectively, each said first and said second pivot jaws including a first cooperative groove for engaging an extended outer surface of said bait hook attachment device and a second cooperative groove for engaging a portion of said outer surface of said hook attachment device, said first cooperative groove extending substantially parallel to and along each said first and said second pivot jaws from adjacent said proximate end of each said first and said second pivot jaws to a second cooperative groove, said second cooperative groove extending from said first cooperative groove to said distal end of each said first and said second pivot jaws;

securing said chamber opening of said bait hook attachment device substantially around said hook shank;

positioning a bait fish in said opening and between said first end and said second end of said bait hook attachment device; and closing said bait hook attachment device around said bait fish by use of said crimping tool operable to engage an outer surface of said bait hook attachment device thereby juxtaposition ing said first end to said second end securing said bait fish therebetween.

3. The method of claim 2 wherein said step of securing said bait hook attachment device to said fish hook includes positioning said bait hook attachment device in said second cooperative grooves of said first and said second pivot jaws and closing said crimping tool.

4. The method for securing bait fish to a fishing hook according to claim 2 including the step of tying said fishing hook to a fishing line.

* * * * *